(12) United States Patent
Frey et al.

(10) Patent No.: US 9,446,751 B2
(45) Date of Patent: Sep. 20, 2016

(54) VACUUM BRAKE FORCE BOOSTER WITH REDUCED NOISE EMISSION AND METHOD FOR MANUFACTURING A VACUUM BRAKE FORCE BOOSTER OF SAID TYPE

(75) Inventors: Karl-Heinz Frey, Lahnstein (DE); Ruediger Eick, Noertershausen (DE)

(73) Assignee: LUCAS AUTOMOTIVE GMBH, Koblenz (DE)

(*) Notice: Subject to any disclaimer, the term of this patent is extended or adjusted under 35 U.S.C. 154(b) by 764 days.

(21) Appl. No.: 13/817,487

(22) PCT Filed: Jul. 7, 2011

(86) PCT No.: PCT/EP2011/003388
§ 371 (c)(1),
(2), (4) Date: Apr. 25, 2013

(87) PCT Pub. No.: WO2012/022395
PCT Pub. Date: Feb. 23, 2012

(65) Prior Publication Data
US 2013/0205985 A1 Aug. 15, 2013

(30) Foreign Application Priority Data
Aug. 19, 2010 (DE) .................. 10 2010 034 828

(51) Int. Cl.
F15B 9/10 (2006.01)
B60T 13/52 (2006.01)
B60T 13/563 (2006.01)

(52) U.S. Cl.
CPC .............. *B60T 13/52* (2013.01); *B60T 13/563* (2013.01); *Y10T 29/49* (2015.01)

(58) Field of Classification Search
CPC ........ F15B 9/10; B60T 13/52; B60T 8/3275; B60T 7/04; B60T 7/042
USPC ........... 188/152, 358–360; 303/114.1, 114.3; 91/369.1–369.2, 376 R; 60/547.1–547.3, 548–590
See application file for complete search history.

(56) References Cited

U.S. PATENT DOCUMENTS

| 4,660,460 A * | 4/1987 | Fulmer ................. B60T 13/569 277/577 |
| 6,065,388 A * | 5/2000 | Tsubouchi ............... B60T 7/12 91/369.2 |
| 6,345,565 B1 * | 2/2002 | Tsubouchi .............. B60T 7/042 91/367 |
| 6,976,417 B2 * | 12/2005 | Leboisne .............. B60T 13/575 91/369.2 |
| 2003/0005819 A1 * | 1/2003 | Schluter ................ B60T 8/3275 91/376 R |
| 2003/0188632 A1 * | 10/2003 | Friedsam .............. B60T 8/3275 91/376 R |

FOREIGN PATENT DOCUMENTS

| DE | 602004002715 T2 | 8/2007 |
| DE | 102008025712 A1 | 12/2009 |
| EP | 1231122 A1 | 8/2002 |
| JP | 2001063549 A | 3/2001 |

* cited by examiner

*Primary Examiner* — Christopher Schwartz
(74) *Attorney, Agent, or Firm* — MacMillan, Sobanski & Todd, LLC

(57) ABSTRACT

A vacuum brake force booster for a motor vehicle brake system comprising: a force input member which is movable along a longitudinal axis and which is or can be coupled to a brake pedal, a control valve arrangement which can be actuated by the force input member, a chamber arrangement which is arranged in a housing and which has at least one working chamber and at least one vacuum chamber separated from one another by means of a movable wall and which has a force output member for transmitting an actuating force, wherein the at least one working chamber can be connected selectively to a vacuum source or to the atmosphere, wherein the control valve arrangement has a control valve housing which is coupled to the at least one movable wall for conjoint movement therewith, wherein the control valve arrangement has a force-transmitting arrangement which has a degree of axial play and which is arranged in the force transmission path between the force input member and the force output member. Here, for noise reduction, it is provided that at least one component of the force-transmitting arrangement is manufactured from magnetic or ferromagnetic material and is subjected to a permanently applied magnetic field.

12 Claims, 5 Drawing Sheets

US 9,446,751 B2

VACUUM BRAKE FORCE BOOSTER WITH REDUCED NOISE EMISSION AND METHOD FOR MANUFACTURING A VACUUM BRAKE FORCE BOOSTER OF SAID TYPE

CROSS-REFERENCE TO RELATED APPLICATIONS

This application is a national stage of International Application No. PCT/EP2011/003388 filed Jul. 7, 2011, the disclosures of which are incorporated herein by reference in entirety, and which claimed priority to German Patent Application No. DE 10 2010 034 828.7 filed Aug. 19, 2010, the disclosures of which are incorporated herein by reference in entirety.

BACKGROUND OF THE INVENTION

The present invention relates to a vacuum brake booster for a motor vehicle brake system, comprising a force input member movable along a longitudinal axis, which force input member is coupled or couplable to a brake pedal, a control valve arrangement actuable by the force input member, a chamber arrangement arranged within a housing, having at least one working chamber and at least one vacuum chamber, which are separated from one another by a movable wall, and a force output member for transmitting an actuating force, wherein the at least one working chamber can be connected selectively with a vacuum source or the atmosphere, wherein the control valve arrangement has a control valve housing, which is coupled with the at least one movable wall for common movement, and wherein the control valve arrangement has a force transmitting arrangement provided with an axial play, which is arranged in the force transmitting path between the force input member and force output member. The invention further relates to a method for manufacturing a brake booster of this type.

A vacuum brake booster of this type is known from the prior art. For example, the document DE 10 2008 025 712 A1 shows such a brake booster. In this prior art, it was realised that noises may occur when the energy freed on releasing the brakes results in an audible striking of a travel limiting element against the housing. Striking noises of this type are undesirable on the part of the motor vehicle manufacturers. This problem is combated according to the prior art by fitting various damping arrangements on or between contact surfaces of components striking against one another, in order thus to damp the striking.

However, it has been found that undesirable noises may also occur in the region of the force transmitting arrangement between the force input member and the force output member. This force transmitting arrangement is usually designed in a manner provided with an axial play, which is necessary in particular in order to avoid too abrupt a response of the brake booster to a brake actuation. Owing to the intentionally provided axial play within the force transmitting arrangement, however, there is the problem, according to the realization of the inventors, that vibrations occurring due to driving may be transmitted to the components of the force transmitting arrangement of the brake booster and these components thus generate undesirable vibration noises. Vibration noises of this type cannot be eliminated by damping arrangements, because damping arrangements in the region of the force transmitting arrangement may interfere with the response characteristic. Moreover, they would be subjected to high mechanical loads and thus wear.

BRIEF SUMMARY OF THE INVENTION

It is therefore a feature of the present invention to provide a vacuum brake booster of the type described at the outset, in which measures are taken to avoid vibrations inducing noises in the force transmitting arrangement between force input member and force output member.

This feature is achieved with a vacuum brake booster of the type described at the outset, in which it is provided that at least one component of the force transmitting arrangement is manufactured from magnetic or ferromagnetic material and is subjected to a permanently applied magnetic field.

The inventors have realized that the force transmitting arrangement provided with an axial play can be acoustically quietened by at least one of its components being manufactured from magnetic or ferromagnetic material and being subjected to a permanently applied magnetic field. As a result, by means of the applied magnetic field, the respective component can be magnetically "biased" into a starting position and to a certain degree held in this position. By this measure, the respective component can be prevented from being able to freely oscillate and thereby pick up vibrations occurring due to driving and transmit them in a manner generating noise. By the invention, it is possible for the vacuum brake booster per se to be left structurally substantially unchanged. Merely by suitable material choice and forming one of the components of the force transmitting arrangement from ferromagnetic or ferrimagnetic material, already the desired effect of avoiding undesirable noises can be achieved when a magnetic field is applied.

According to a development of the invention, it may be provided that the force transmitting arrangement has, viewed in the axial direction from the force input member to the force output member, a transmitting piston, a contact element and a rubber-elastic reaction disc abutting against the force output member. Furthermore, in one embodiment of the invention, it is possible for the force transmitting arrangement to have a travel limiting element. At least one of these components—transmitting piston, contact element, reaction disc and travel limiting element—may, according to the invention, be magnetized and at least one other of these components may, according to the invention, be of ferromagnetic form. It is understood that, according to the invention, also a plurality of components or the entire force transmitting arrangement may be of ferromagnetic form and one of the components is of permanent magnetic form or a permanent magnetic field is imposed from outside.

According to an embodiment variant of the invention, it may be provided that the rubber-elastic reaction disc is formed with magnetizable particles, in particular of ferromagnetic material, these particles being magnetizable to form a magnetic field. The rubber-elastic reaction disc is usually manufactured from a rubber material. During manufacture, there can be incorporated into this material accordingly ferromagnetic material, for example metal powders, without altering their physical properties.

Alternatively to a changed material choice for the individual components, it is further possible, according to the invention, for a permanent magnet to be fitted on or integrated in at least one component of the control valve arrangement. In this connection, one embodiment of the invention provides that the permanent magnet is fitted on or integrated in the control valve housing. For this purpose, a special recess may be provided in the control valve housing.

Additionally or alternatively to this embodiment variant, it is further possible, according to the invention, for the permanent magnet to be fitted on or integrated in the contact element. Moreover, in this connection, it may further be provided that the permanent magnet is fitted on or integrated in the transmitting piston.

According to the invention, it is preferably provided that the magnetic field acts in the axial direction, i.e. in the direction of the longitudinal axis. It is, however, sufficient for the magnetic field to have a force component in the axial direction.

As explained at the outset, the invention also relates to a method for manufacturing a vacuum brake booster of the type described above, wherein the vacuum brake booster comprises: a force input member movable along a longitudinal axis, which force input member is coupled or couplable to a brake pedal, a control valve arrangement actuable by the force input member, a chamber arrangement arranged within a housing, having at least one working chamber and at least one vacuum chamber, which are separated from one another by a movable wall, and a force output member for transmitting an actuating force, wherein the at least one working chamber can be connected selectively with a vacuum source or the atmosphere, wherein the control valve arrangement has a control valve housing, which is coupled with the at least one movable wall for common movement, and wherein the control valve arrangement has a force transmitting arrangement provided with an axial play, which is arranged in the force transmitting path between the force input member and force output member. The method according to the invention is distinguished by steps:

manufacturing at least one component of the force transmitting arrangement from ferrimagnetic or ferromagnetic material and applying a permanent magnetic field to the force transmitting arrangement.

In this method, the at least one component of the force transmitting arrangement may be magnetized already before installation or not until after installation. The latter has the advantage that, for example, picking up ferritic particles during transportation to the assembly line is prevented because of the lack of magnetic interaction.

Other advantages of this invention will become apparent to those skilled in the art from the following detailed description of the preferred embodiments, when read in light of the accompanying drawings.

DETAILED DESCRIPTION OF THE INVENTION

Figure 1:
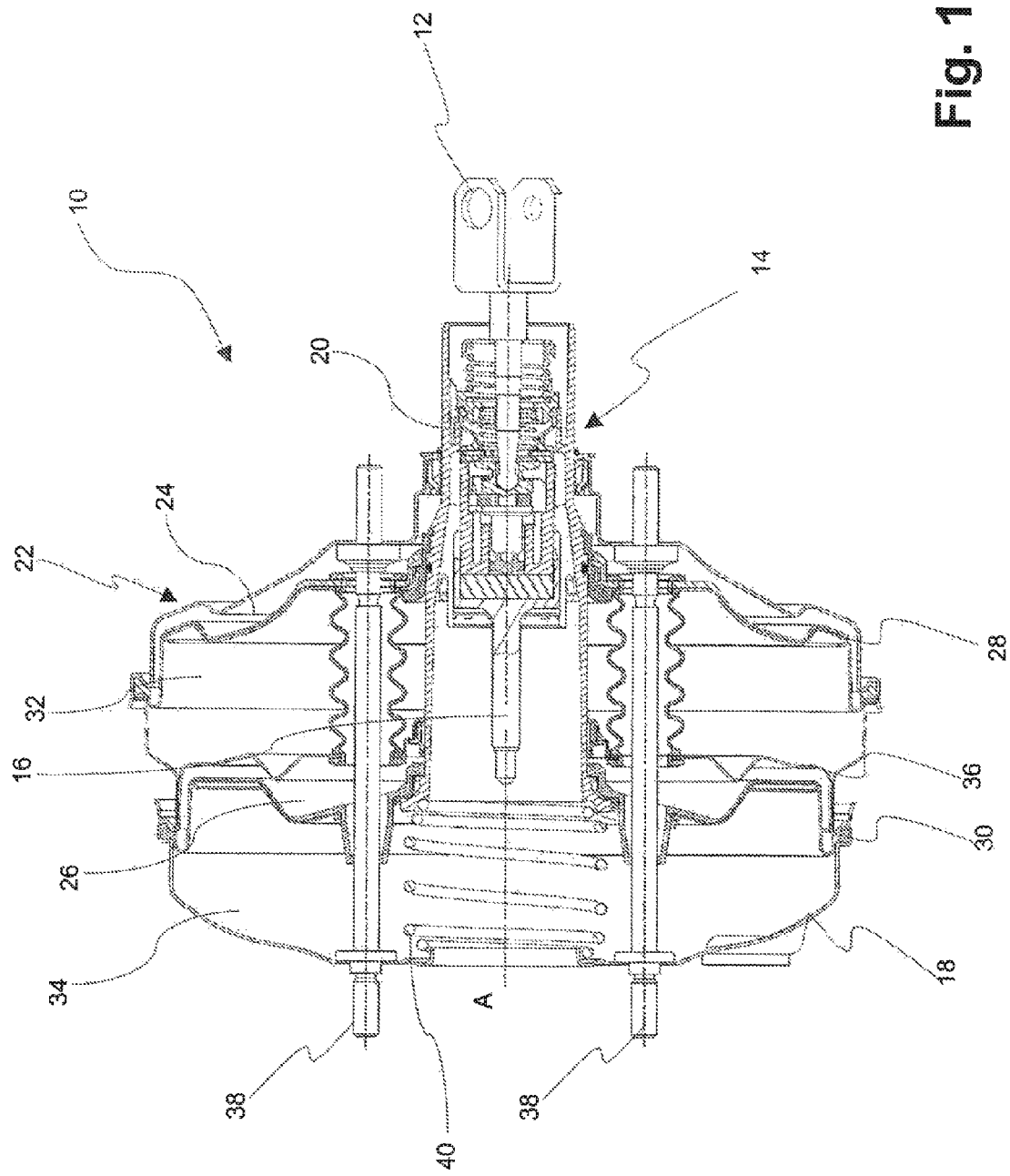
FIG. 1 illustrates an axis-containing sectional view through a vacuum brake booster according to the invention.

In FIG. 1, a vacuum brake booster according to the invention is shown in an axis-containing sectional view and designated generally by 10. This brake booster comprises a force input member 12, which is couplable to a brake pedal (not shown). The force input member 12 extends, with its left-hand end in FIG. 1, into a control valve arrangement 14, which will be described in detail with reference to FIGS. 2-5. The control valve arrangement 14 has a force output member 16, which is couplable to a brake master cylinder (not shown). The control valve arrangement 14 is accommodated in a housing 18 and displaceable in the latter along a longitudinal axis A. The control valve arrangement has a control valve housing 20.

In the housing 18 there is provided a chamber arrangement 22. In the embodiment shown, this is a tandem chamber arrangement. The latter comprises a first working chamber 24 and a second working chamber 26. Each of the two working chambers 24 and 26 is separated from a vacuum chamber 32, 34 by respectively one movable wall 28, 30 fixedly coupled to the control valve housing 20. In other words, in the chamber arrangement 22 there is provided a first pair consisting of working chamber 24 and vacuum chamber 32 and a second pair consisting of working chamber 26 and vacuum chamber 34. These two pairs are in turn separated by a wall 36 fixed in the housing 18. The entire housing 18 with its chamber arrangement 22 is penetrated by a plurality of fastening bolts 38, which serve for mounting the vacuum brake booster 10 on a vehicle chassis.

In the operation of the vehicle, the vacuum chambers 32 and 34 are permanently connected to a vacuum source, for example the intake tract of the vehicle. The working chambers 24 and 26 can, in manner known per se, be connected selectively with the vacuum source or the ambient atmosphere depending on the actuation of the control valve arrangement 14, in order to boost a brake force exerted via the brake pedal and the force input member 12. The control valve housing 20 is biased into the position shown in FIG. 1 via the return spring 40.

Figure 2:
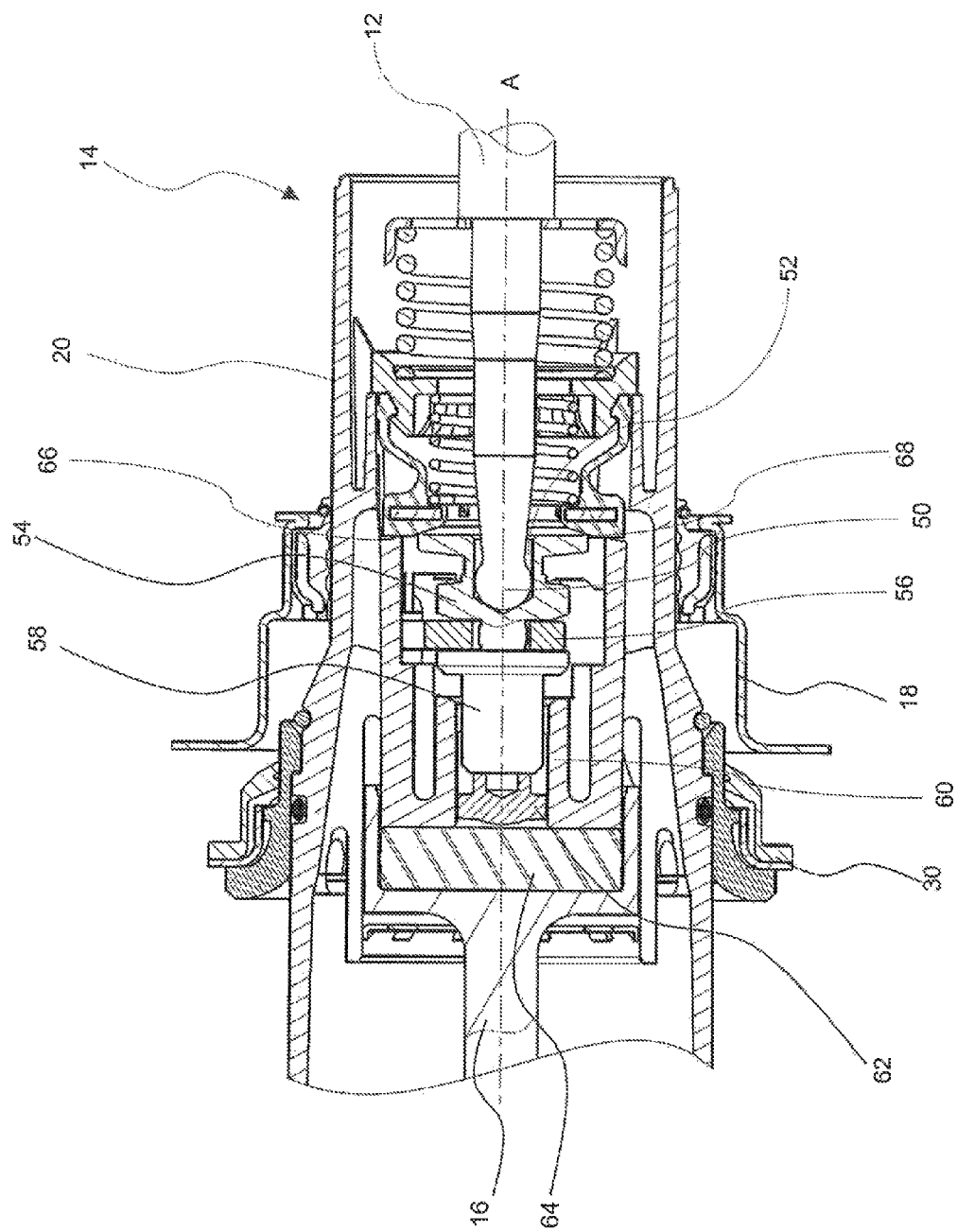
FIG. 2 illustrates a detail sectional view of the control valve arrangement of a first embodiment of the brake booster according to the invention.

FIG. 2 shows the control valve arrangement 14 in a detail illustration. It can be seen that the force input member 12 projects into the control valve housing 20 along the longitudinal axis A. A spherical end 50 of the force input member is accommodated in a corresponding receptacle 52 of a transmitting piston 54. The latter has an annular recess, in which a stop element 56 is fitted. The stop element 56 defines the starting position, shown in FIG. 1, of the control valve housing 20 relative to the housing 18.

At its left-hand end in FIG. 2, transmitting piston 54 has a cylindrical section 58. The latter projects into a narrowed-diameter region 60 of the control valve housing 20. A contact element 62 is accommodated with axial play in this region. Furthermore, FIG. 2 shows a rubber-elastic reaction disc 64, which is accommodated in a pot-like receptacle of the force output member 16 and is in working abutment with the control valve housing 20.

Finally, FIG. 2 shows the usual arrangement for a vacuum brake booster of inner and outer sealing seats 66 and 68 for selectively connecting the working chambers 24, 26 with the vacuum source or the ambient atmosphere. This will not be discussed in further detail, since it is known.

As mentioned above, the contact element 62 is accommodated with axial play in the narrowed-diameter region 60 of the control valve housing 20. In the embodiment according to FIGS. 1 and 2, the transmitting piston 54 is of magnetized form and the contact element 62 of ferromagnetic form. It is understood that also the contact element 62 may be of magnetized form and the transmitting piston 58 of ferromagnetic form or both parts of magnetized form. In any case, each of the aforementioned possibilities achieves the effect that the contact element 62 remains permanently in the position shown in FIG. 2 in abutment with the section 58 of the transmitting piston 54 owing to the applied magnetic forces. If, therefore, vibrations occur due to the vehicle operation, they do not result in the contact element 62 vibrating relative to the section 58 of the transmitting piston 54 and generating corresponding vibration noises. Through the application of a magnetic field according to the invention, the contact element 62 is so to speak magnetically "biased" into its position shown in FIG. 2 and thus protected from noise-inducing vibrations.

Figure 3:
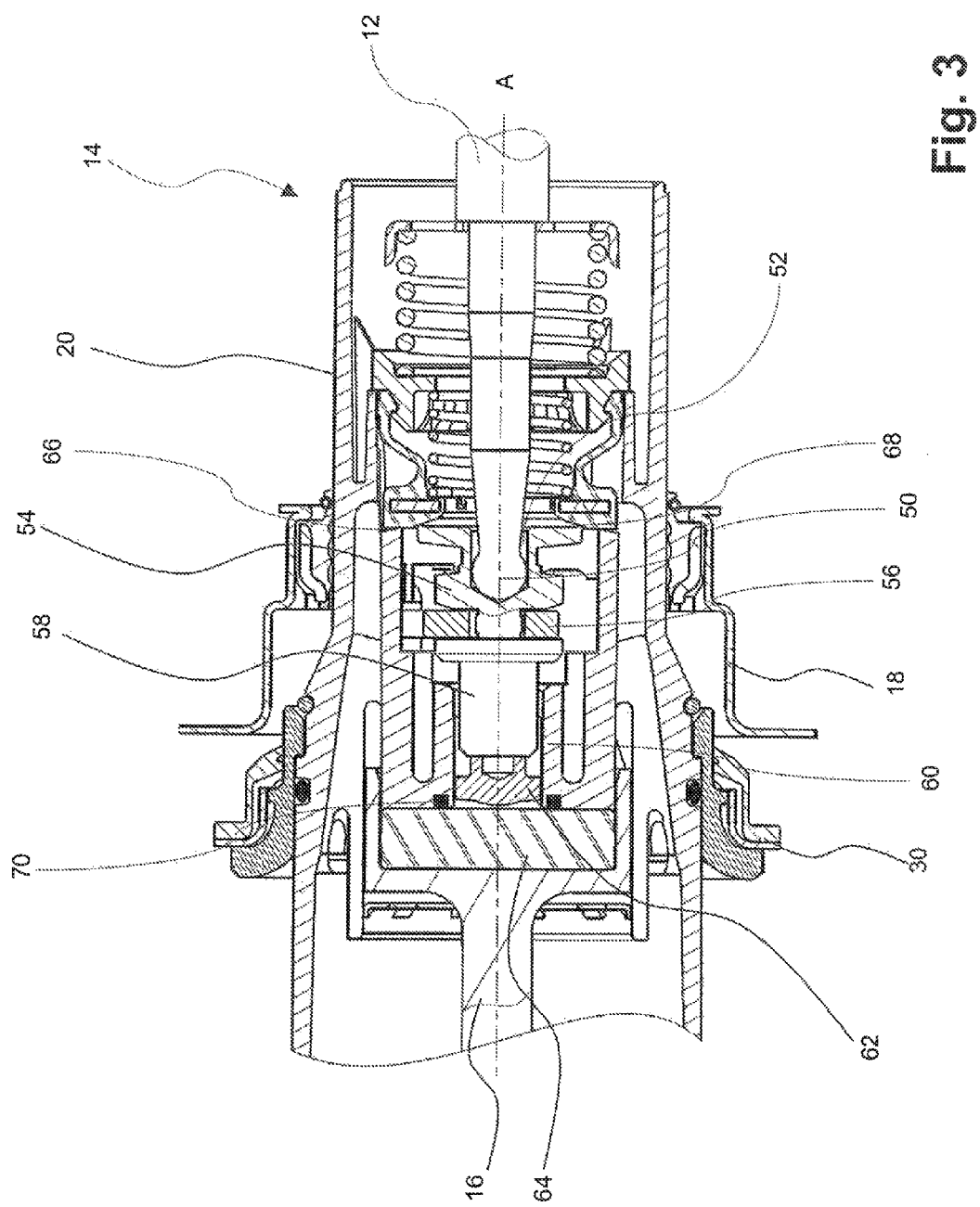
FIG. 3 illustrates a detail sectional view of the control valve arrangement of a second embodiment of the brake booster according to the invention.

FIG. 3 shows a second embodiment of the invention. This differs from the first embodiment according to FIG. 2 in that a permanent magnet 70 is inserted into a corresponding recess on the end face of the control valve housing 20 facing the rubber-elastic reaction disc 64. The permanent magnet 70 is, for example, of annular form and ensures a magnetic field in the direction of the longitudinal axis A. The contact element 62 and the transmitting piston 54/58 here may again be of ferromagnetic or magnetized form. In any case, the magnetic field of the permanent magnet 70 acts again in such a way that the contact element 62 is magnetically "biased" onto the transmitting piston 54/58.

The use of the prefabricated permanent magnet 70 has the advantage that the latter can be designed with a predetermined field strength and that the rest of the components of the force transmitting arrangement can be formed merely of ferromagnetic material, without having to pay particular attention to their magnetization.

Figure 4:
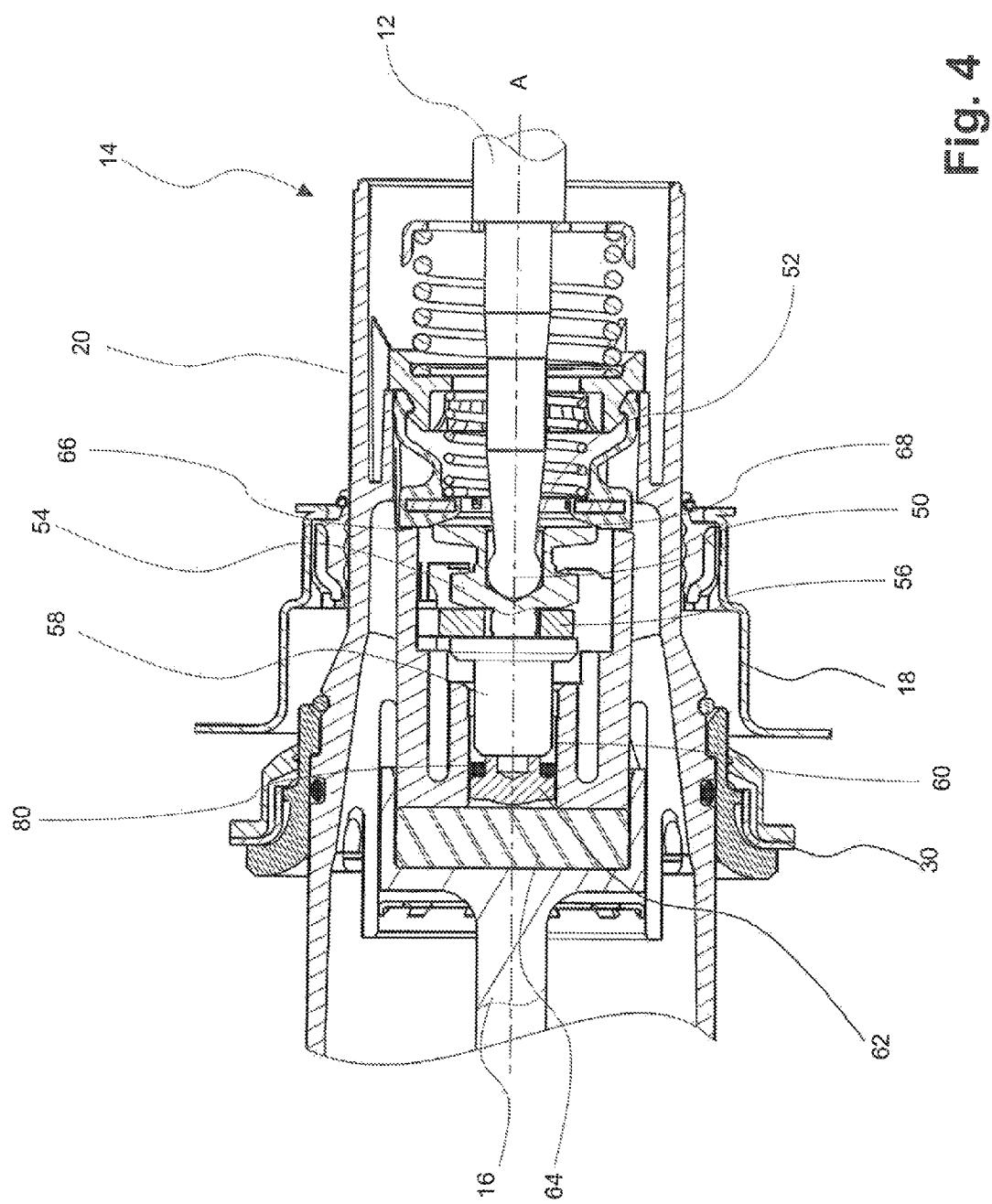
FIG. 4 illustrates a detail sectional view of the control valve arrangement of a third embodiment of the brake booster according to the invention.

FIG. 4 shows a further embodiment of the invention, which differs from the embodiment according to FIG. 3 in that a permanent magnet 80 is now arranged on the contact element 62. The functioning remains the same as described with reference to FIGS. 2 and 3.

Figure 5:
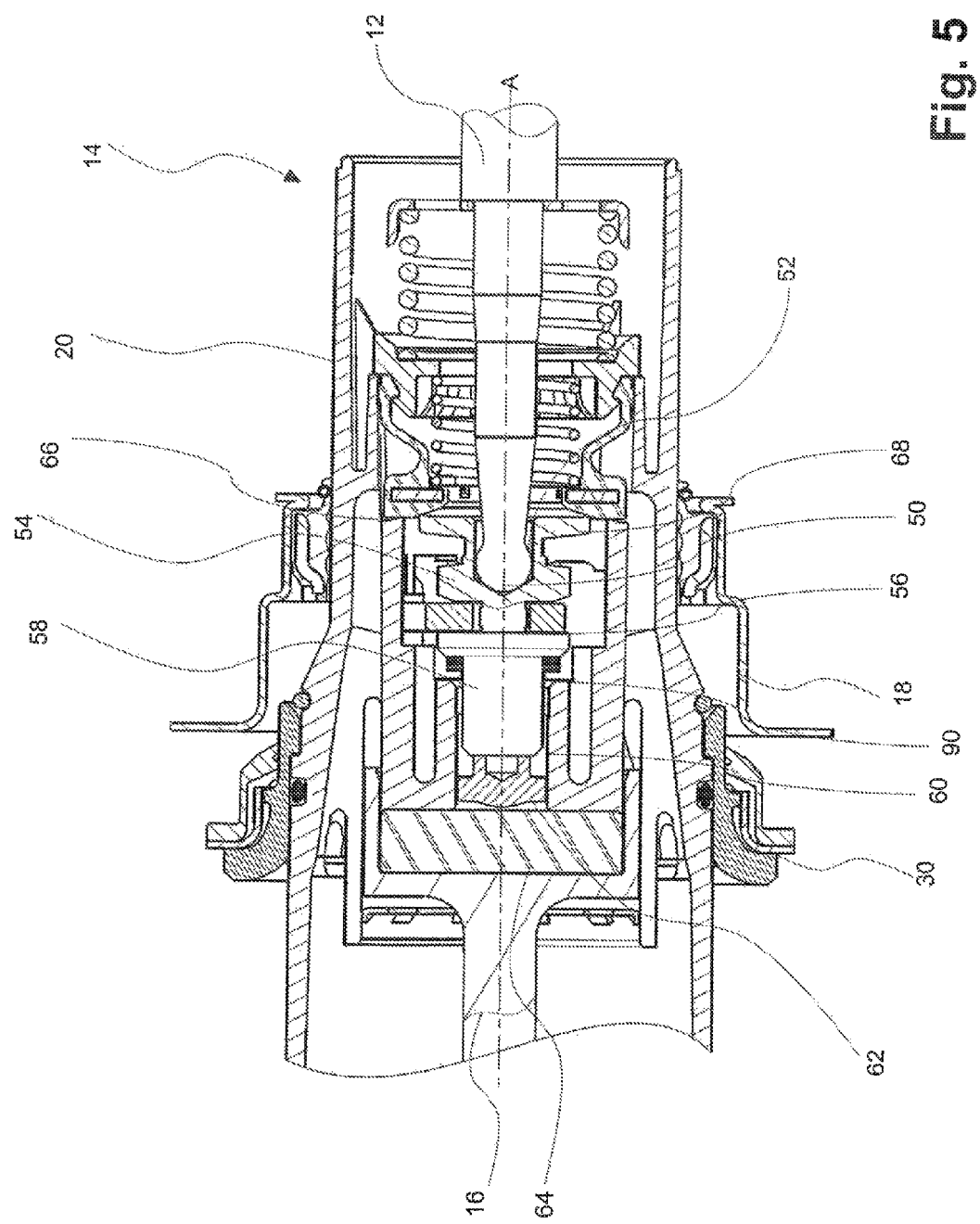
FIG. 5 illustrates a detail sectional view of the control valve arrangement of a fourth embodiment of the brake booster according to the invention.

Finally, FIG. 5 shows a further embodiment of the invention, in which a permanent magnet 90 is fitted on the transmitting piston 54/58. Again, the functioning is the same as described with reference to FIGS. 2 and 3.

The embodiments according to FIGS. 2 to 5 may be combined with one another according to the invention, namely in such a way that a plurality of components are provided with corresponding permanent magnets 70, 80, 90 or are directly magnetized.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A vacuum brake booster for a motor vehicle brake system, comprising:
   a force input member movable along a longitudinal axis, which force input member is coupled or couplable to a brake pedal,
   a control valve arrangement actuable by the force input member,
   a chamber arrangement arranged within a housing, having at least one working chamber and at least one vacuum chamber, which are separated from one another by a movable wall, and
   a force output member for transmitting an actuating force, wherein the at least one working chamber can be connected selectively with a vacuum source or the atmosphere, wherein the control valve arrangement has a control valve housing, which is coupled with the movable wall for common movement,
   wherein the control valve arrangement has a force transmitting arrangement provided with an axial play, which is arranged in a force transmitting path between the force input member and force output member,
   wherein at least one component of the three transmitting arrangement is manufactured from magnetic or ferromagnetic material and is subjected to a permanently applied magnetic field, in order to magnetically bias the at least one component into a starting position.

2. The vacuum brake booster according to claim 1, wherein the force transmitting arrangement has a travel limiting element.

3. The vacuum brake booster according to claim 2, wherein one of the transmitting piston, contact element, rubber elastic reaction disc and travel limiting element is magnetized and at least one other of the transmitting piston, contact element, rubber-elastic reaction disc and travel limiting element is of ferromagnetic form.

4. The vacuum brake booster according to claim 3, wherein the rubber-elastic reaction disc is formed with magnetizable particles, the particles being magnetized to form a magnetic field.

5. The vacuum brake booster according to claim 4,
   wherein the magnetizable particles are a ferromagnetic material.

6. The vacuum brake booster according to claim 1, wherein the force transmitting arrangement has, viewed in an axial direction from the force input member to the force output member, a transmitting piston, a contact element and a rubber-elastic reaction disc abutting against the force output member.

7. The vacuum brake booster according to claim 6, wherein a permanent magnet is fitted on or integrated in at least one component of the control valve arrangement.

8. The vacuum brake booster according to claim 7, wherein the permanent magnet is fitted on or integrated in the control valve housing.

9. The vacuum brake booster according to claim 7, wherein the permanent magnet is fitted on or integrated in the contact element.

10. The vacuum brake booster according to claim 7, wherein the permanent magnet is fitted on or integrated in the transmitting piston.

11. The vacuum brake booster according to claim 1,
    wherein the magnetic field acts in an axial direction.

12. A method for manufacturing a vacuum brake booster, comprising:
    a force input member movable along a longitudinal axis, which force input member is coupled or couplable to a brake pedal;
    a control valve arrangement actuable by the force input member,
    a chamber arrangement arranged within a housing, having at least one working chamber and at least one vacuum chamber, which are separated from one another by a movable wall, and
    a force output member for transmitting an actuating force, wherein the at least one working chamber can be connected selectively with a vacuum source or the atmosphere, wherein the control valve arrangement has a control valve housing, which is coupled with the at least one movable wall for common movement,
    wherein the control valve arrangement has a force transmitting arrangement provided with an axial play, which is arranged in a force transmitting path between the force input member and force output member,
comprising the steps of:
- manufacturing at least one component of the force transmitting arrangement from a magnetic or ferromagnetic material and
- applying a permanent magnetic field to the force transmitting arrangement in order to magnetically bias the at least one component into a starting position.

* * * * *